(12) United States Patent
Abou Mahmoud et al.

(10) Patent No.: US 10,917,376 B2
(45) Date of Patent: *Feb. 9, 2021

(54) ORIGIN-BASED CONSOLIDATION OF RELATED CONTENT WITHIN SOCIAL NETWORK POSTS

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/406,734

(22) Filed: May 8, 2019

(65) Prior Publication Data
US 2019/0268299 A1    Aug. 29, 2019

Related U.S. Application Data

(63) Continuation of application No. 14/567,964, filed on Dec. 11, 2014, now Pat. No. 10,326,728.

(51) Int. Cl.
*H04L 12/58* (2006.01)
*G06F 16/9535* (2019.01)
*G06Q 50/00* (2012.01)

(52) U.S. Cl.
CPC .......... *H04L 51/32* (2013.01); *G06F 16/9535* (2019.01); *G06Q 50/01* (2013.01)

(58) Field of Classification Search
None
See application file for complete search history.

(56) References Cited

U.S. PATENT DOCUMENTS

| 7,844,604 | B2 | 11/2010 | Baio et al. |
| 8,225,219 | B2 | 7/2012 | Edelen |
| 8,260,333 | B2 | 9/2012 | Goldberg |
| 8,495,105 | B2 | 7/2013 | Campbell et al. |
| 8,594,465 | B2 | 11/2013 | Karlov et al. |
| 8,914,331 | B2 | 12/2014 | Kawai |

(Continued)

OTHER PUBLICATIONS

IBM, List of IBM Patents or Patent Applications Treated as Related, Applicant Appendix, Jul. 26, 2019, pp. 1-2, the contents of which are incorporated herein by reference in their entirety.

(Continued)

*Primary Examiner* — Angela Nguyen
(74) *Attorney, Agent, or Firm* — L. Jeffrey Kelly (57) ABSTRACT

Multiple social network postings that originate from a single social network user are detected within a social network. The multiple social network postings that originate from the single social network user are analyzed using configured posting relationship identification criteria. Based upon the analysis of the multiple social network postings that originate from the single social network user using the configured posting relationship identification criteria, a determination is made that at least two of the multiple social network postings that originate from the single social network user include related content. The content of the at least two social network postings determined to include the related content is concatenated into a single consolidated social network post.

18 Claims, 4 Drawing Sheets

(56) References Cited

U.S. PATENT DOCUMENTS

| | | | |
|---|---|---|---|
| 9,923,862 | B2 | 3/2018 | Abou Mahmoud et al. |
| 10,171,411 | B2 | 1/2019 | Abou Mahmoud et al. |
| 10,187,339 | B2 | 1/2019 | Geva |
| 2007/0185871 | A1 | 8/2007 | Canright et al. |
| 2009/0210800 | A1 | 8/2009 | McCann et al. |
| 2011/0142071 | A1 | 6/2011 | Farrell et al. |
| 2011/0231499 | A1 | 9/2011 | Stovicek |
| 2014/0081925 | A1 | 3/2014 | Haeberle et al. |
| 2014/0172427 | A1 | 6/2014 | Liu et al. |
| 2014/0280640 | A1 | 9/2014 | Keohane |
| 2016/0004761 | A1 | 1/2016 | Zhang et al. |
| 2016/0063011 | A1 | 3/2016 | Wehbi et al. |
| 2016/0104474 | A1 | 4/2016 | Bunn et al. |
| 2016/0173435 | A1 | 6/2016 | Abou Mahmoud et al. |
| 2018/0115511 | A1 | 4/2018 | Abou Mahmoud et al. |
| 2019/0116151 | A1 | 4/2019 | Abou Mahmoud et al. |

OTHER PUBLICATIONS

United States Patent and Trademark Office, Office Action for U.S. Appl. No. 16/214,093, dated Jun. 27, 2019, pp. 1-27, Alexandria, VA, USA.

Author Unknown, SemanticSim_V06: Semantic Similarity Tools for V0.6 and above, ytex: Clinical NLP, Semantic Similarity, Data Mining, Nov. 17, 2012, pp. 1-5, Published online at: http://code.google.com/p/ytex/wiki/SemanticSim_V06.

IBM, List of IBM Patents or Patent Applications Treated as Related, Applicant Appendix, May 6, 2019, pp. 1-2, the contents of which are incorporated herein by reference in their entirety.

United States Patent and Trademark Office, Office Action for U.S. Appl. No. 14/567,964, dated Jun. 8, 2017, pp. 1-24, Alexandria, VA, USA.

United States Patent and Trademark Office, Office Action for U.S. Appl. No. 14/567,964, dated Nov. 15, 2017, pp. 1-13, Alexandria, VA, USA.

United States Patent and Trademark Office, Advisory Action for U.S. Appl. No. 14/567,964, dated Jan. 31, 2018, pp. 1-4, Alexandria, VA, USA.

United States Patent and Trademark Office, Office Action for U.S. Appl. No. 14/567,964, dated Jul. 6, 2018, pp. 1-13, Alexandria, VA, USA.

United States Patent and Trademark Office, Notice of Allowance for U.S. Appl. No. 14/567,964, dated Feb. 7, 2019, pp. 1-13, Alexandria, VA, USA.

United States Patent and Trademark Office, Office Action for U.S. Appl. No. 14/747,128, dated Mar. 2, 2017, pp. 1-23, Alexandria, VA, USA.

United States Patent and Trademark Office, Office Action for U.S. Appl. No. 14/747,128, dated Aug. 25, 2017, pp. 1-20, Alexandria, VA, USA.

United States Patent and Trademark Office, Notice of Allowance for U.S. Appl. No. 14/747,128, dated Nov. 8, 2017, pp. 1-8, Alexandria, VA, USA.

United States Patent and Trademark Office, Corrected Notice of Allowance for U.S. Appl. No. 14/747,128, dated Dec. 29, 2017, pp. 1-6, Alexandria, VA, USA.

United States Patent and Trademark Office, Office Action for U.S. Appl. No. 15/185,265, dated Dec. 29, 2017, pp. 1-36, Alexandria, VA, USA.

United States Patent and Trademark Office, Notice of Allowance for U.S. Appl. No. 15/185,265, dated Jul. 13, 2018, pp. 1-20, Alexandria, VA, USA.

United States Patent and Trademark Office, Notice of Allowance for U.S. Appl. No. 15/185,265, dated Sep. 12, 2018, pp. 1-14, Alexandria, VA, USA.

United States Patent and Trademark Office, Office Action for U.S. Appl. No. 15/853,183, dated Oct. 29, 2018, pp. 1-34, Alexandria, VA, USA.

United States Patent and Trademark Office, Notice of Allowance for U.S. Appl. No. 15/853,183, dated Mar. 18, 2019, pp. 1-12, Alexandria, VA, USA.

Pending U.S. Appl. No. 16/450,990, filed on Jun. 24, 2019, entitled: "Communication Message Consolidation With Content Difference Formatting", 39 pages.

ORIGIN-BASED CONSOLIDATION OF RELATED CONTENT WITHIN SOCIAL NETWORK POSTS

BACKGROUND

The present invention relates to social networks. More particularly, the present invention relates to origin-based consolidation of related content within social network posts.

Social networks allow social network users to interact and communicate with one another. Social network users may also post images and comment on postings of other users.

SUMMARY

A method includes: detecting, by a processor within a social network, multiple social network postings that originate from a single social network user; analyzing the multiple social network postings that originate from the single social network user using configured posting relationship identification criteria; determining, based upon the analysis of the multiple social network postings that originate from the single social network user using the configured posting relationship identification criteria, that at least two of the multiple social network postings that originate from the single social network user comprise related content; and concatenating the content of the at least two social network postings determined to comprise the related content into a single consolidated social network post.

A system includes a memory; and a processor programmed to: detect, within a social network, multiple social network postings that originate from a single social network user; analyze the multiple social network postings that originate from the single social network user using configured posting relationship identification criteria stored within the memory; determine, based upon the analysis of the multiple social network postings that originate from the single social network user using the configured posting relationship identification criteria, that at least two of the multiple social network postings that originate from the single social network user comprise related content; and concatenate the content of the at least two social network postings determined to comprise the related content into a single consolidated social network post.

A computer program product includes a computer readable storage medium having computer readable program code embodied therewith, where the computer readable program code when executed on a computer causes the computer to: detect, within a social network, multiple social network postings that originate from a single social network user; analyze the multiple social network postings that originate from the single social network user using configured posting relationship identification criteria; determine, based upon the analysis of the multiple social network postings that originate from the single social network user using the configured posting relationship identification criteria, that at least two of the multiple social network postings that originate from the single social network user comprise related content; and concatenate the content of the at least two social network postings determined to comprise the related content into a single consolidated social network post.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides origin-based consolidation of related content within social network posts. The present technology solves a recognized problem within social networks by providing technology that includes a new form of origin-based social network message processing that consolidates related social network postings made by individual social network users to reduce a number of postings received by other users, and to reduce the total messaging load within social network environments. The present technology detects multiple social network postings that originate from a single social network user and analyzes the postings that originate from the single social network user using configured posting relationship identification criteria. Based upon this analysis, the present technology determines that at least two of the multiple social network postings that originate from the single social network user include related content. The related content of the social network postings is concatenated into a single consolidated social network post, and the single consolidated social network post that includes the concatenated related content is published to a social network. As such, by use of concatenation and/or other consolidation techniques (e.g., batch delivery of posts from a single user without interleaved posts from other users, generation of a single summary post that captions and/or condenses content of multiple posts generated over time by a single user, etc.), the present technology may reduce the number of individual posts that users have to navigate and read within a social network, and may reduce the total message posting/processing overhead within the social network, thereby improving efficiency for both social network users and the social network infrastructure.

The present technology uses multiple alternative techniques to identify and group related posts before recipients receive the posts. Identification and grouping of posts may be performed based upon identification of a relationship in time of the individual posts, identification of a relationship in topic of the individual posts, identification of a relationship in keywords used in the individual posts, identification of a relationship in tag names of social network tags (e.g., #tagname and @tagname) of the individual posts, identification of a relationship in re-tweets of the individual posts, and other forms of identification and grouping as appropriate for a given implementation.

It should be additionally noted that while the examples herein utilize text for purposes of example, non-textual content of posts may also be utilized to correlate related posts, and the non-textual content of multiple posts may also be consolidated. Non-textual content may include image content of still images, videos, graphics, or other forms of image content that are posted by a single user within different social network posts. The different posts may be correlated as related posts by use of image recognition to identify posts with similar or sequential image content. As such, the other techniques for identification and grouping of related posts described herein may be applied to non-textual content and the examples below are considered to apply at least equally to posts that are exclusively non-textual content and posts that have intermixed text and non-text content.

The present technology operates by detecting that a user has begun posting status updates, tweets, blog posts, etc. The present technology then tracks the posts within a pre-set relationship identification threshold, such as a time-based or other form of threshold. Posts that are related within the pre-set relationship identification threshold may be consolidated and sent to recipients as a single post or a smaller number of posts. The transformation and consolidation of the multiple posts into a smaller number of posts or a single post may be performed before the posts are posted to the social network site or after the posts are posted as a posting "cleanup service." Alternatively, transformation and consolidation of the multiple posts into a smaller number of posts or a single post may be performed on the recipient's client-side device.

Further regarding the identification and grouping of related posts introduced above, several configurable posting relationship identification options/criteria may be provided, either independently or in combination. The following additional details describe several configurable posting relationship identification options/criteria, though it is noted that other possibilities exist for identification and grouping of related posts from a single user, and all such possibilities are considered to be within the scope of the present description.

Regarding time-based posting relationship identification criteria, the present technology may identify related posts from the same origin based upon time periods. The following example message sequence may be detected and processed to determine that the messages are related in time. For purposes of example, it is presumed that a social network user "A" posts a first message "First day of vacation" at 11:05:37 am. It is further presumed that the same social network user "A" posts a second message "Pretty excited to go to on a cruise" at 11:06:00 am, and then posts a third message "This is my first cruise" at 11:06:14 am. The time-based posting relationship identification may be performed based upon criteria that the message time stamps are within a particular configurable time period (e,g., one (1) minute as an example time-based criterion) and by detecting that the postings from the single user meet these criteria. The multiple time-related postings from the single user may be consolidated within the social network into one message "First day of vacation, Pretty excited to go on a cruise, This is my first cruise," with a timestamp for purposes of the present example of 11:05:37 am (e.g., a timestamp of the first consolidated post, though another of the timestamps may be used). It should be noted that the intermediate or last posting time stamp may be used as appropriate for a given implementation, as with the other examples herein.

Regarding grammar-based posting relationship identification criteria, the present technology may identify related posts from the same origin based upon grammar. The following example message sequence may be detected and processed to determine that the messages are related grammatically. For purposes of example, it is presumed that the social network user "A" instead posts a first message "First day of vacation and I" at 11:05:14 am. It is further presumed that the same social network user "A" posts a second message "am pretty excited to go to on a cruise" at 11:06:00 am, then posts a third message "for the first time" at 11:06:37 am, then posts a fourth message "Today I'm flying to the cruise departure city" at 11:08:34 am, and then posts a fifth message "with my wife and son" at 11:09:12 am. The grammar-based posting relationship identification may be performed by detection of postings from the single user that are grammatically related. The multiple grammar-related postings from the single user may be consolidated within this example into two messages within the social network: a first post of "First day of vacation and I am pretty excited to go to on a cruise for the first time," with a time stamp of 11:05:14 am (e.g., a timestamp of the first consolidated post in the first post, though another of the timestamps may be used), and a second post of "Today I'm flying to the cruise departure city with my wife and son," with a time stamp of 11:08:34 am (e.g., a timestamp of the first consolidated post in the second post, though another of the timestamps may be used). As noted above, intermediate or last time stamps may also be used.

Regarding keyword/subject-based posting relationship identification criteria, the present technology may identify related posts from the same origin based upon keywords and/or the subjects of posts. The following example message sequence may be detected and processed to determine that the messages have related keywords or subjects. For purposes of example, it is presumed that the social network user "A" instead posts a first message "Heading out to lunch if anyone is free today" at 11:35:14 am. It is further presumed that the same social network user "A" posts a second message "Sushi sounds like a good idea to me" at 11:36:00 am, then posts a third message "Me and my buddy are in the sushi restaurant downtown" at 11:50:37 am, then posts a fourth message "The food tastes amazing" at 12:15:34 pm, and posts a fifth message "Some dessert would be nice to go with that meal" at 12:20:12 pm. The keyword/subject-based posting relationship identification may be performed by detection of postings with related keywords and/or subjects from the single user, and by detection of different relationships in time using the time stamps. The multiple keyword/subject-related postings from the single user may be consolidated within this example into two messages within the social network: a first post of "Heading out to lunch if anyone is free today, Sushi sounds like a good idea to me," with a time stamp of 11:35:14 am (e.g., again with a timestamp of the first consolidated post in the first post, though another of the timestamps may be used), and a second post of "Me and my buddy are in the sushi restaurant downtown, The food tastes amazing, Some dessert would be nice to go with that meal," with a time stamp of 11:50:37 am (e.g., also with a timestamp of the first consolidated post in the second post, though another of the timestamps may be used). As noted above, intermediate or last time stamps may also be used.

Regarding tag-based posting relationship identification criteria, the present technology may identify related posts from the same origin based upon social network tags used within posts. The following example message sequence may be detected and processed to determine that the messages have related tags. For purposes of example, it is presumed that the social network user "A" instead posts a first message "Anyone watch the Olympics opening ceremony? #olympics" at 11:05:14 am. It is further presumed that the same social network user "A" posts a second message "I have it on my video recorder if anyone is interested #olympics" at 11:10:00 am, then posts a third message "It is near lunch time and I am getting hungry," at 11:12:36 am, and then posts a fourth message "Make sure to check out the US soccer team #olympics #soccer" at 11:15:06 am. The tag-based posting relationship identification may be performed by detection of postings with related tags from the single user, and by detection of different relationships in time using the time stamps. It should further be noted that the time interval for relationship correlation may be configured by the user (e.g., within five (5) minutes of one another in this example). The multiple tag-related postings from the single user may be consolidated within this example into two posts within the social network: a first post of: "Anyone watch the Olympics opening ceremony? #olympics, I have it on my video recorder if anyone is interested #olympics, Make sure to check out the US soccer team #olympics #soccer," with a time stamp of 11:05:14 am, and a second post of "It is near lunch time and I am getting hungry," with a time stamp of 11:12:36 am. Similar analysis and options as described above for assignment of timestamps may apply to these consolidated posts. As such, within this example tag-based posting relationship identification, posts that utilize the same/similar tags have been consolidated, and the post that does not utilize a tag has been separated. It should be noted that commas have been added to separate the different individual posts, though other forms of grammar-based syntax may be provided for readability of consolidated posts. As noted above, intermediate or last time stamps may also be used.

Regarding text analytic s-based posting relationship identification criteria, the present technology may identify related posts from the same origin based upon text analytics of the content of posts. Text analytics may include evaluation of terms, including verb and verb tense, nouns and noun placement, and other forms of analysis of the text content of posts. As described in association with the example above, the present technology may further programmatically determine by analysis of the text of the several different posts using text analytics techniques that the text of the separate message (e.g., "It is near lunch time and I am getting hungry") is not related to the tagged posts that are consolidated (e.g., that were all related to the Olympics).

Feedback and post consolidation tuning may also be provided to allow a user to review and tune posting consolidation. As such, the present technology may be implemented with user inputs to guide the programmatic determinations, and the programmatic determinations may be programmatically improved over time.

It should be noted that conception of the present subject matter resulted from recognition of certain limitations associated with social network communications. For example, it was observed that a problem exists with prior social media technology because a flood of updates and postings from other social network users may lead to social network users "defriending" other social network user or may even deter non-social network persons from entering the world of social media. It was observed that social network users may receive multiple updates from the same social network content within minutes or even seconds of each other. For example, a social network user that has just entered a restaurant may send multiple check-in updates, a picture of a restaurant menu, a picture of the food they ordered, comments on the service the user received, a food review, and other related postings. It was further observed that each of these types of updates create a separate message that is received by another social network user's mobile device, and that the extensive set of messages may disrupt and/or distract the receiving user's current activities and cause the recipient to have to manipulate each received message in a message list of the recipient even if the recipient is not interested in the particular topic of the posting. The present technology solves this technical problem by tracking postings of individual social network users to identify related postings, and by consolidating related postings into combined social network postings. As such, the present subject matter may reduce social network messaging load and may reduce social network message influx to social network users by providing for origin-based consolidation of related content within social network posts, as described above and in more detail below. As such, improved social network user experience and reduced social network messaging load may be obtained through use of the present technology.

The origin-based consolidation of related content within social network posts described herein may be performed in real time to allow prompt consolidation of multiple related social network posts that originate from a user. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
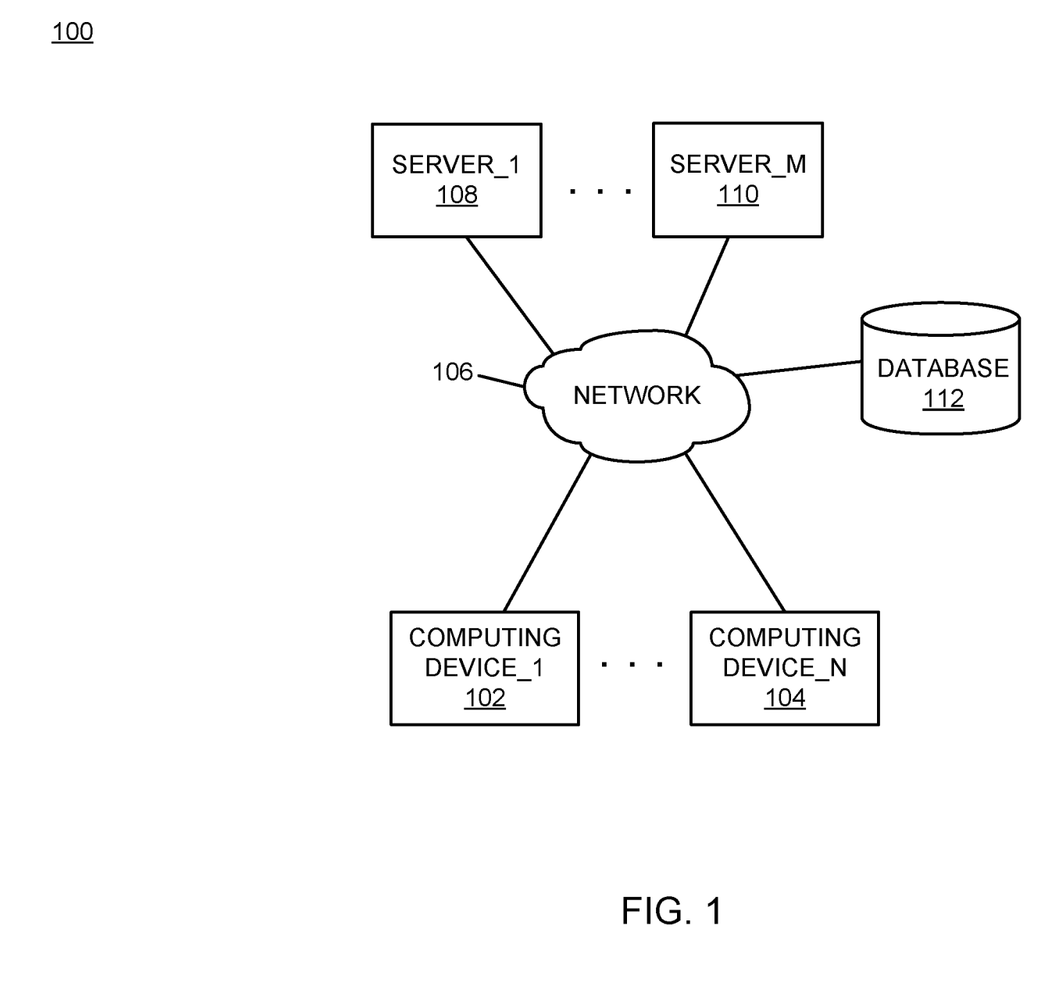
FIG. 1 is a block diagram of an example of an implementation of a system for origin-based consolidation of related content within social network posts according to an embodiment of the present subject matter.

FIG. 1 is a block diagram of an example of an implementation of a system 100 for origin-based consolidation of related content within social network posts. A computing device_1 102 through a computing device_N 104 communicate via a network 106 with several other devices. The other devices include a server_1 108 through a server_M 110, and a database 112.

As will be described in more detail below in association with FIG. 2 through FIG. 4, the computing device_1 102 through the computing device_N 104 and/or the server_1 108 through the server_M 110 may each provide automated origin-based consolidation of related content within social network posts. The automated origin-based consolidation of related content within social network posts is based upon programmatic detection of related postings within a social network, and programmatic consolidation of posts that are determined to be related, as described above and in more detail below. As such, the present technology may be implemented at a user computing device or server device level. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a social network service, a web server, an application server, or other data server device.

The database 112 may include a relational database, an object database, or any other storage type of device. As such, the database 112 may be implemented as appropriate for a given implementation.

Figure 2:
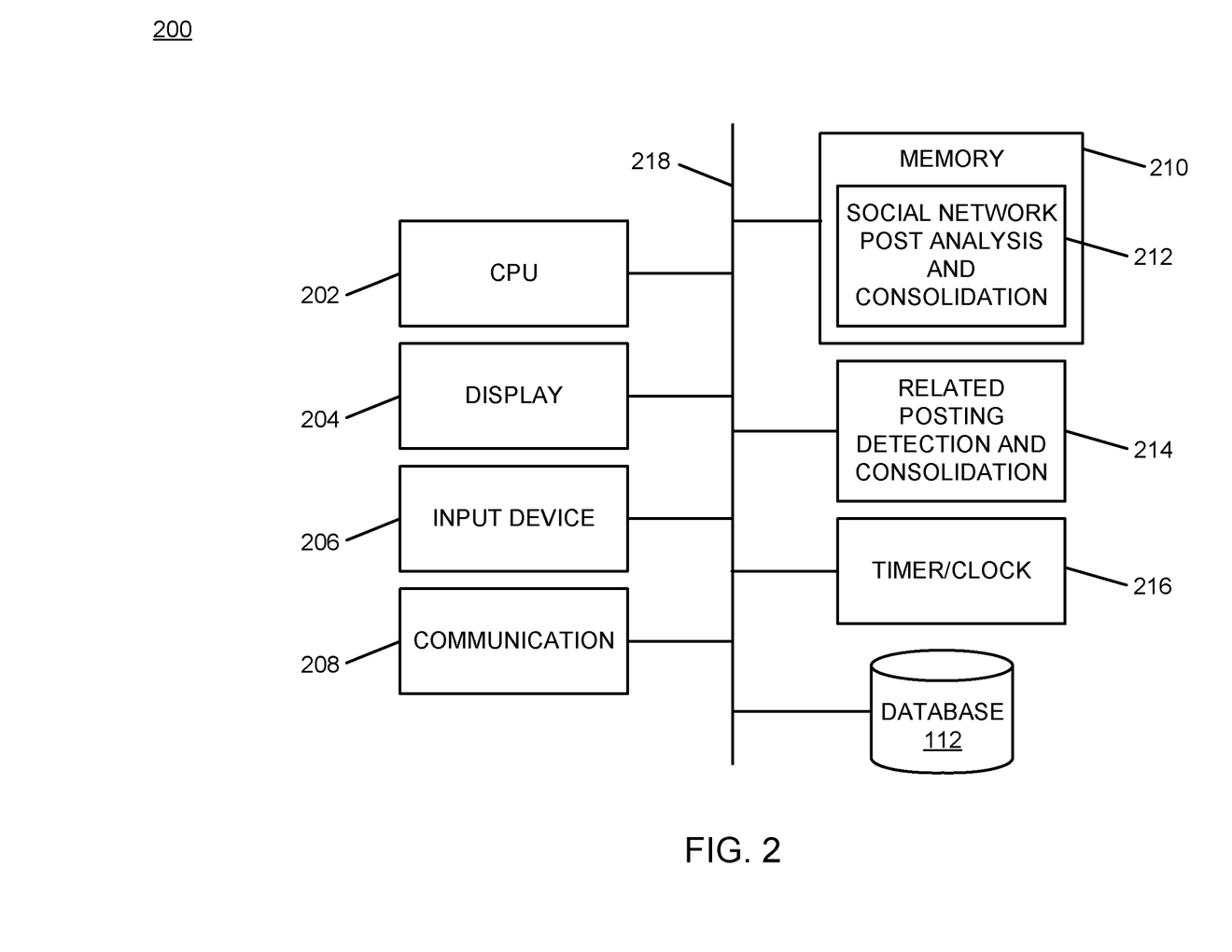
FIG. 2 is a block diagram of an example of an implementation of a core processing module capable of performing origin-based consolidation of related content within social network posts according to an embodiment of the present subject matter.

FIG. 2 is a block diagram of an example of an implementation of a core processing module 200 capable of performing origin-based consolidation of related content within social network posts. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of related social network posts and posting consolidation in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a social network post analysis and consolidation area 212 that stores social network posts during analysis and consolidation within the core processing module 200. It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A related posting detection and consolidation module 214 is also illustrated. The related posting detection and consolidation module 214 provides social network post analysis and consolidation for the core processing module 200, as described above and in more detail below. The related posting detection and consolidation module 214 implements the automated origin-based consolidation of related content within social network posts of the core processing module 200.

It should also be noted that the related posting detection and consolidation module 214 may form a portion of other circuitry described without departure from the scope of the present subject matter. Further, the related posting detection and consolidation module 214 may alternatively be implemented as an application stored within the memory 210. In such an implementation, the related posting detection and consolidation module 214 may include instructions executed by the CPU 202 for performing the functionality described herein. The CPU 202 may execute these instructions to provide the processing capabilities described above and in more detail below for the core processing module 200. The related posting detection and consolidation module 214 may form a portion of an interrupt service routine (ISR), a portion of an operating system, a portion of a browser application, or a portion of a separate application without departure from the scope of the present subject matter.

A timer/clock module 216 is illustrated and used to determine timing and date information, such as social network posting time stamps, as described above and in more detail below. As such, the related posting detection and consolidation module 214 may utilize information derived from the timer/clock module 216 for information processing activities, such as the origin-based consolidation of related content within social network posts.

The database 112 is again shown within FIG. 2 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the related posting detection and consolidation module 214, the timer/clock module 216, and the database 112 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 3:
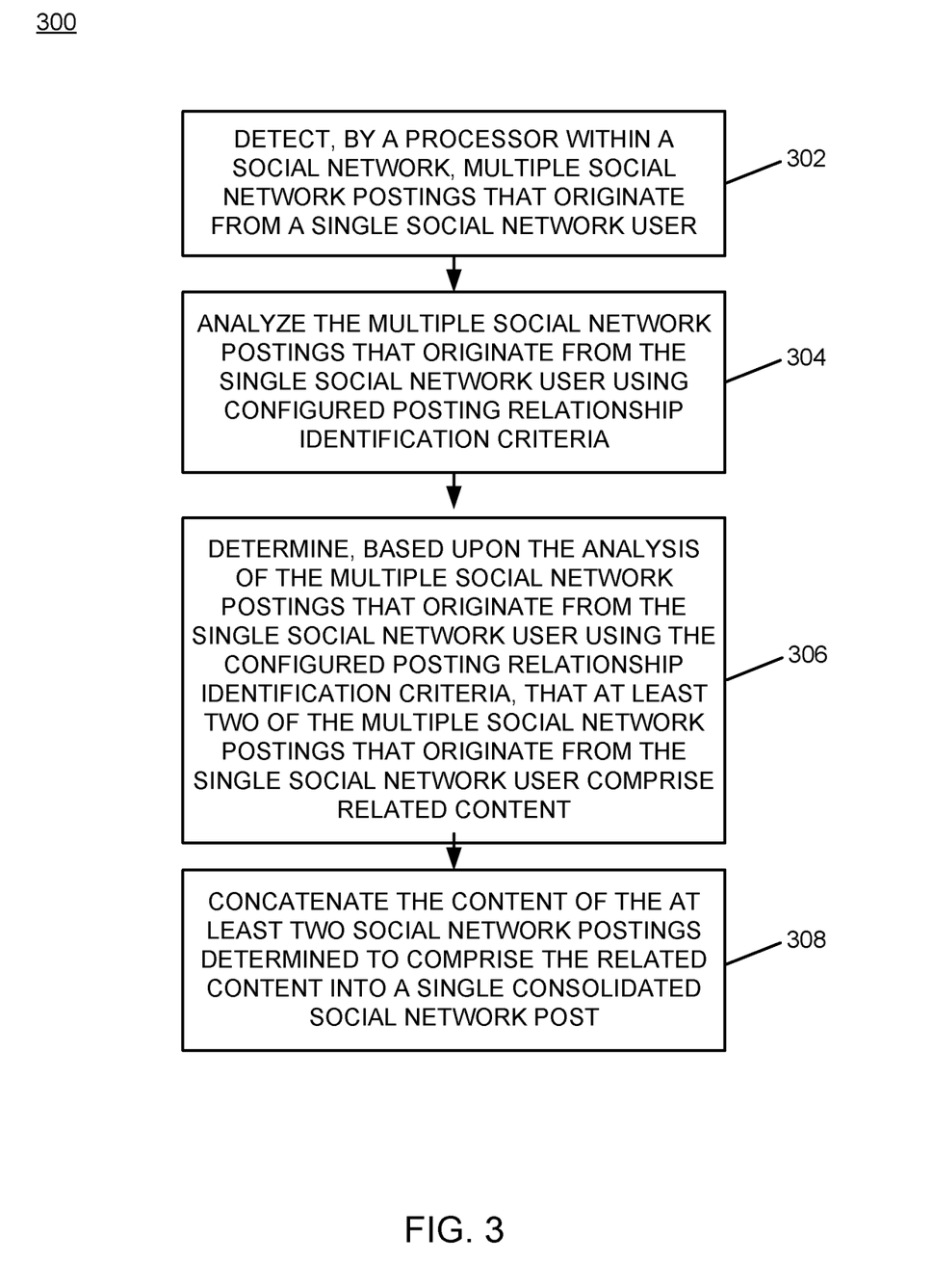
FIG. 3 is a flow chart of an example of an implementation of a process for origin-based consolidation of related content within social network posts according to an embodiment of the present subject matter.
Figure 4:
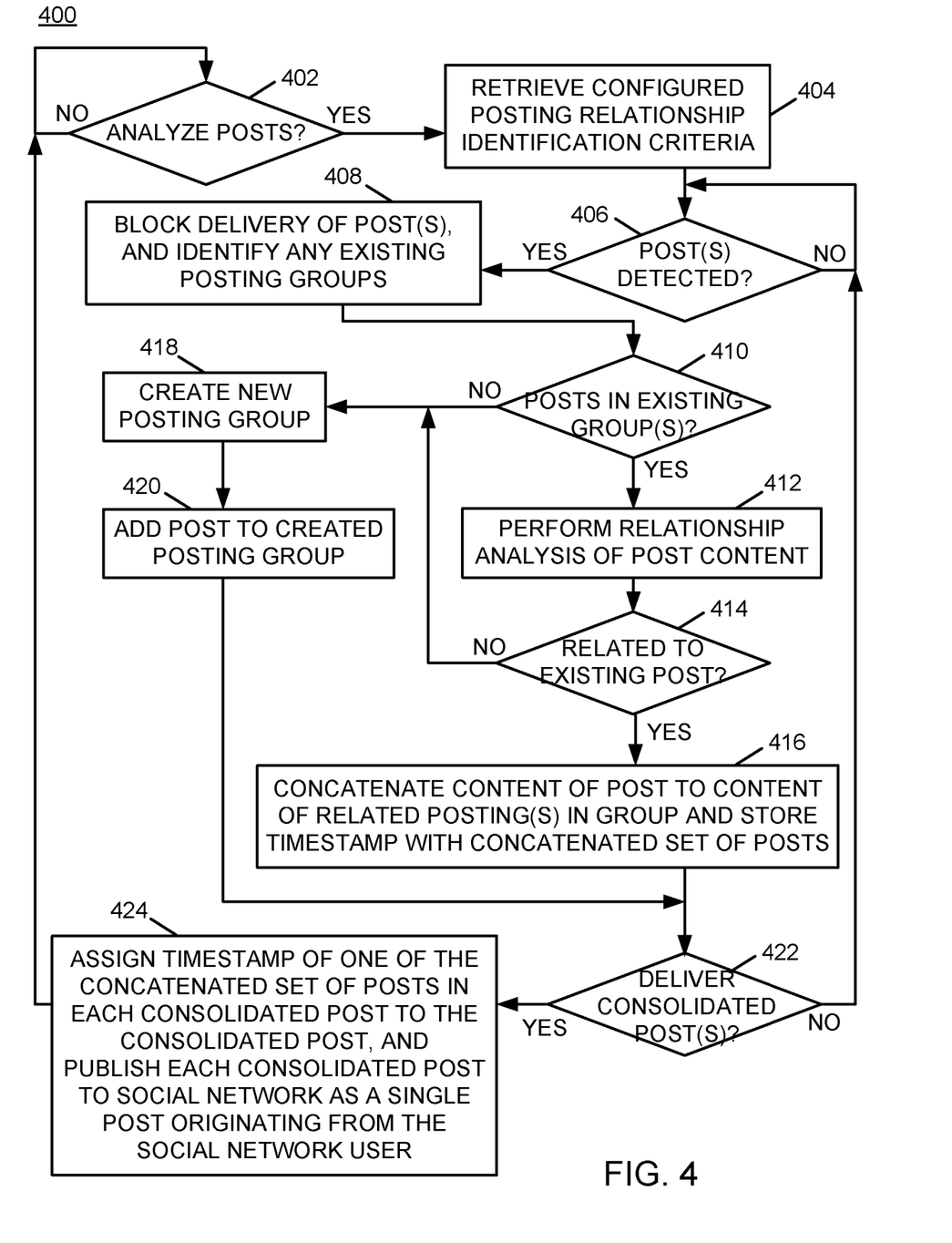
FIG. 4 is a flow chart of an example of an implementation of a process for origin-based consolidation of related content within social network posts using post categorization and relationship analysis of post content according to an embodiment of the present subject matter.

FIG. 3 through FIG. 4 described below represent example processes that may be executed by devices, such as the core processing module 200, to perform the automated origin-based consolidation of related content within social network posts associated with the present subject matter. Many other variations on the example processes are possible and all are considered within the scope of the present subject matter. The example processes may be performed by modules, such as the related posting detection and consolidation module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for origin-based consolidation of related content within social network posts. At block 302, the process 300 detects, by a processor within a social network, multiple social network postings that originate from a single social network user. At block 304, the process 300 analyzes the multiple social network postings that originate from the single social network user using configured posting relationship identification criteria. At block 306, the process 300 determines, based upon the analysis of the multiple social network postings that originate from the single social network user using the configured posting relationship identification criteria, that at least two of the multiple social network postings that originate from the single social network user comprise related content. At block 308, the process 300 concatenates the content of the at least two social network postings determined to comprise the related content into a single consolidated social network post.

FIG. 4 is a flow chart of an example of an implementation of a process 400 for origin-based consolidation of related content within social network posts using post categorization and relationship analysis of post content. At decision point 402, the process 400 makes a determination as to whether to analyze posts to identify related posts for origin-based consolidation. For example, the processing within the process 400 may be performed periodically, continually, at startup of a particular system, at user login, or otherwise as appropriate for a given implementation. The processing within the process 400 may be applied to each social network user as an origin of social network content/posts to perform the origin-based consolidation of related content within social network posts.

In response to determining to analyze posts to identify related posts for origin-based consolidation, the process 400 retrieves configured posting relationship identification criteria at block 404. As described above, several different criteria may be configured for identification of related posts (e.g., time-based, grammar-based, keyword/subject-based, tag-based, etc.). The process 400 may retrieve and utilize the configured posting relationship identification criteria to process posts within a social network. It should be noted that where the process 400 is performed during a user login to a social network for example, posts that were posted prior to invocation of the process 400 may be processed, in addition to subsequent posts.

At decision point 406, the process 400 makes a determination as to whether one or more posts are detected. It should be noted that posts may be detected and processed as a set or individually. Iterative selection of each individual post for processing is not illustrated to focus on the technical processing performed by the process 400.

In response to detecting at least one social network post at decision point 406, the process 400 blocks delivery of the detected post(s) within the social network, and identifies any existing posting groups at block 408. It should be noted that posts that occur during a configured time period may be categorized with one another, but that the content may suggest different groupings and different concatenations, including interleaved concatenation. As such, certain posts within a group may be concatenated into a single consolidated posts, while certain other posts may concatenated with different posts in the group into a different consolidated post, or may not be concatenated with different posts, as appropriate for a given implementation. Additionally, consolidated posts may be distributed as created or distributed routinely (e.g., periodically, at user log in, etc.). As such, posting groups may exist and already have posts designated for consolidation when a subsequent post is received and analyzed.

As such, at decision point 410, the process 400 makes a determination as to whether any posts are in any existing post group(s) to which the social network post has been categorized by the posting relationship identification criteria analysis. In response to determining that one or more posts is in an existing posting group to which the social network post is categorized, the process 400 performs relationship analysis of post content among the posts within the grouped posts using the configured posting relationship identification criteria at block 412. At decision point 414, the process 400 makes a determination as to whether any of the grouped posts are related based upon the relationship analysis. In response to determining that the social network post is related to at least one other grouped post, the process 400 concatenates the content of the social network post to content of any related post(s), and stores the timestamp of the post with the other concatenated set of posts, at block 416. As described in more detail below, one of the timestamps of the concatenated set of posts may be utilized and designated as a timestamp of the concatenated post. For example, a timestamp of a first post in a concatenated set of posts may be used as the time stamp for the consolidated social network post. Alternatively, a timestamp of a last post or an intermediate post in the concatenated set of posts may be used.

Returning to the description of decision point 410 and decision point 414, in response to determining at decision point 410 that there are no posts in any existing post group(s) to which the social network post is categorized by the posting relationship identification criteria analysis, or in response to determining at decision point 414 that no grouped posts are related based upon the posting relationship identification criteria, the process 400 creates a new posting group at block 418. At block 420, the process 400 adds the social network post to the created posting group.

In response to adding the social network post to the created posting group at block 420, or in response to concatenating the social network post to any related post(s) at block 416, the process 400 makes a determination at decision point 422 as to whether to deliver any consolidated social network posts. For example, time-based criteria for sending/posting consolidated posts may be configured, such as by use of the timer/clock module 216, to regulate a frequency at which the consolidated posts are sent to social network users. As such, in addition to consolidating related posts, the process 400 may further perform time-based management of distribution of the consolidated posts within the social network.

In response to determining at decision point 422 not to deliver any consolidated social network posts, the process 400 returns to decision point 406 to detect and process additional social network posts, and iterates as described above. Alternatively, in response to determining at decision point 422 to deliver any consolidated social network posts, the process 400 assigns a timestamp of one of the concatenated set of posts in each consolidated post as the timestamp of the consolidated post, and publishes each consolidated post to the social network as a single post originating from the social network user at block 424. As such, the process 400 designates the single consolidated post as a single social network post originating from the single social network user. The process 400 returns to decision point 402 and iterates as described above.

As such, the process 400 performs both consolidation of social network posts into concatenated posts, and also performs time-based management of publishing of the consolidated posts. Accordingly, the process 400 may improve user experiences within a social network by grouping related social network posts to improve coherence of the information therein, and may reduce social network posting load and frequency.

As described above in association with FIG. 1 through FIG. 4, the example systems and processes provide origin-based consolidation of related content within social network posts. Many other variations and additional activities associated with origin-based consolidation of related content within social network posts are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:

analyzing, by a processor that manages publication of social network postings within a social network, content of multiple separate social network postings delivered to the social network that originate from a single social network user using configured posting relationship identification criteria usable to identify groupings of related social network postings;

determining, based upon the analysis of the content of the multiple separate social network postings delivered to the social network that originate from the single social network user using the configured posting relationship identification criteria, that at least two of the multiple separate social network postings delivered to the social network that originate from the single social network user comprise related content and thereby form a related group of separate social network postings;

concatenating the content from one of the at least two separate social network postings determined to comprise the related content into the content of the other of the at least two separate social network postings to form a single consolidated social network post; and blocking publication to the social network of the multiple separate social network postings delivered to the social network that originate from the single social network user to provide processing time for the analysis of the content of the multiple separate social network postings.

2. The method of claim 1, further comprising publishing the single consolidated social network post that comprises the concatenated content to the social network.

3. The method of claim 1, further comprising:
blocking publication to the social network of the multiple separate social network postings delivered to the social network that originate from the single social network user to provide processing time for the identification of the groupings of the related social network postings.

4. The method of claim 1, further comprising:
reading a timestamp from each of the at least two of the multiple separate social network postings delivered to the social network that originate from the single social network user and that are determined to form the related group of separate social network postings; and
assigning the timestamp of one of the at least two separate social network postings determined to comprise the related content as a timestamp of the single consolidated social network post.

5. The method of claim 1, where analyzing the content of the multiple separate social network postings delivered to the social network that originate from the single social network user using the configured posting relationship identification criteria usable to identify the groupings of related social network postings comprises:
performing relationship analysis of the content within the at least two of the multiple separate social network postings using the configured posting relationship identification criteria; and
determining that the content within the at least two of the multiple separate social network postings is related based upon the relationship analysis of the content within the at least two of the multiple separate social network postings.

6. The method of claim 1, where the configured posting relationship identification criteria comprise criteria selected from a group consisting of time-based posting relationship identification criteria, grammar-based posting relationship identification criteria, keyword/subject-based posting relationship identification criteria, tag-based posting relationship identification criteria, and text analytics-based posting relationship identification criteria.

7. A system comprising:
a memory; and
a processor that manages publication of social network postings within a social network programmed to:
analyze, within the social network, content of multiple separate social network postings delivered to the social network that originate from a single social network user using configured posting relationship identification criteria stored within the memory and usable to identify groupings of related social network postings;
determine, based upon the analysis of the content of the multiple separate social network postings delivered to the social network that originate from the single social network user using the configured posting relationship identification criteria, that at least two of the multiple separate social network postings delivered to the social network that originate from the single social network user comprise related content and thereby form a related group of separate social network postings;
concatenate the content from one of the at least two separate social network postings determined to comprise the related content into the content of the other of the at least two separate social network postings to form a single consolidated social network post; and
block publication to the social network of the multiple separate social network postings delivered to the social network that originate from the single social network user to provide processing time for the analysis of the content of the multiple separate social network postings.

8. The system of claim 7, where the processor is further programmed to publish the single consolidated social network post that comprises the concatenated content to the social network.

9. The system of claim 7, where the processor is further programmed to:
block publication to the social network of the multiple separate social network postings delivered to the social network that originate from the single social network user to provide processing time for the identification of the groupings of the related social network postings.

10. The system of claim 7, where the processor is further programmed to:
read a timestamp from each of the at least two of the multiple separate social network postings delivered to the social network that originate from the single social network user and that are determined to form the related group of separate social network postings; and
assign the timestamp of one of the at least two separate social network postings determined to comprise the related content as a timestamp of the single consolidated social network post.

11. The system of claim 7, where, in being programmed to analyze the content of the multiple separate social network postings delivered to the social network that originate from the single social network user using the configured posting relationship identification criteria usable to identify the groupings of related social network postings, the processor is programmed to:
perform relationship analysis of the content within the at least two of the multiple separate social network postings using the configured posting relationship identification criteria; and
determine that the content within the at least two of the multiple separate social network postings is related based upon the relationship analysis of the content within the at least two of the multiple separate social network postings.

12. The system of claim 7, where the configured posting relationship identification criteria comprise criteria selected from a group consisting of time-based posting relationship identification criteria, grammar-based posting relationship identification criteria, keyword/subject-based posting relationship identification criteria, tag-based posting relationship identification criteria, and text analytics-based posting relationship identification criteria.

13. A computer program product, comprising:
a computer readable storage medium having computer readable program code embodied therewith, where the computer readable program code when executed on a computer that manages publication of social network postings within a social network causes the computer to:
analyze, within the social network, content of multiple separate social network postings delivered to the social network that originate from a single social network user using configured posting relationship identification criteria usable to identify groupings of related social network postings;

determine, based upon the analysis of the content of the multiple separate social network postings delivered to the social network that originate from the single social network user using the configured posting relationship identification criteria, that at least two of the multiple separate social network postings delivered to the social network that originate from the single social network user comprise related content and thereby form a related group of separate social network postings;

concatenate the content from one of the at least two separate social network postings determined to comprise the related content into the content of the other of the at least two separate social network postings to form a single consolidated social network post; and block publication to the social network of the multiple separate social network postings delivered to the social network that originate from the single social network user to provide processing time for the analysis of the content of the multiple separate social network postings.

14. The computer program product of claim 13, where the computer readable program code when executed on the computer further causes the computer to publish the single consolidated social network post that comprises the concatenated content to the social network.

15. The computer program product of claim 13, where the computer readable program code when executed on the computer further causes the computer to:

block publication to the social network of the multiple separate social network postings delivered to the social network that originate from the single social network user to provide processing time for the identification of the groupings of the related social network postings.

16. The computer program product of claim 13, where the computer readable program code when executed on the computer further causes the computer to:

read a timestamp from each of the at least two of the multiple separate social network postings delivered to the social network that originate from the single social network user and that are determined to form the related group of separate social network postings; and assign the timestamp of one of the at least two separate social network postings determined to comprise the related content as a timestamp of the single consolidated social network post.

17. The computer program product of claim 13, where, in causing the computer to analyze the content of the multiple separate social network postings delivered to the social network that originate from the single social network user using the configured posting relationship identification criteria usable to identify the groupings of related social network postings, the computer readable program code when executed on the computer causes the computer to:

perform relationship analysis of the content within the at least two of the multiple separate social network postings using the configured posting relationship identification criteria; and determine that the content within the at least two of the multiple separate social network postings is related based upon the relationship analysis of the content within the at least two of the multiple separate social network postings.

18. The computer program product of claim 13, where the configured posting relationship identification criteria comprise criteria selected from a group consisting of time-based posting relationship identification criteria, grammar-based posting relationship identification criteria, keyword/subject-based posting relationship identification criteria, tag-based posting relationship identification criteria, and text analytics-based posting relationship identification criteria.

* * * * *